June 15, 1948.　　　W. G. FARRAR, JR　　　2,443,381
AUTOMOBILE TRAY
Filed April 19, 1946
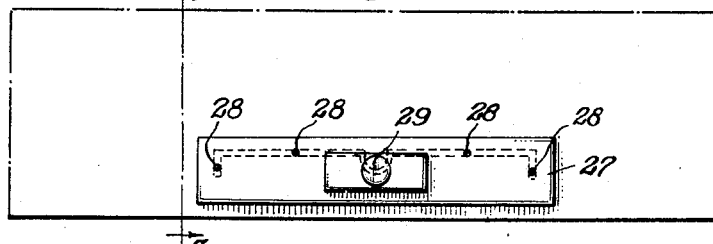
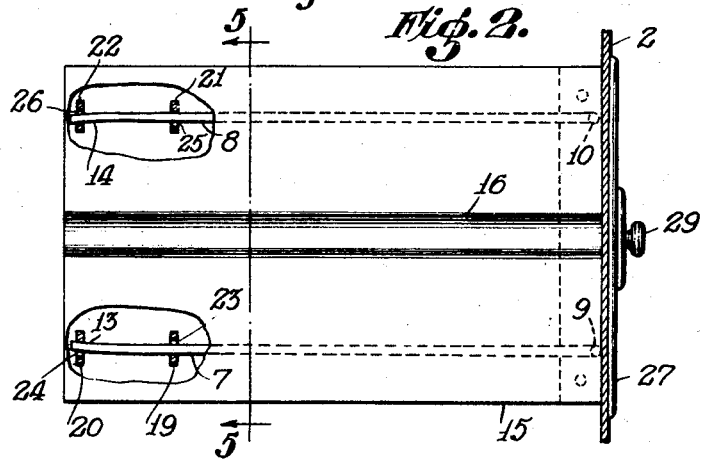
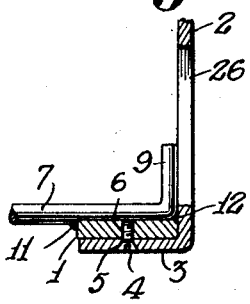
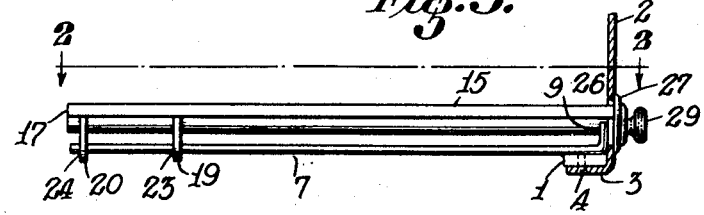
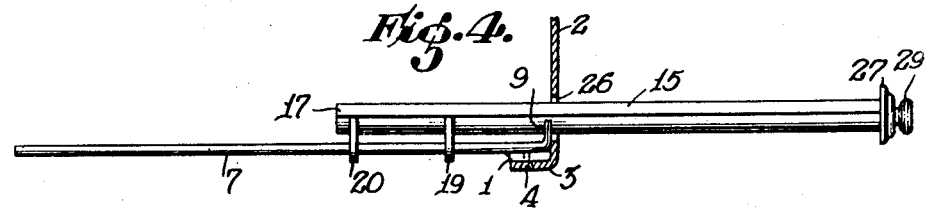
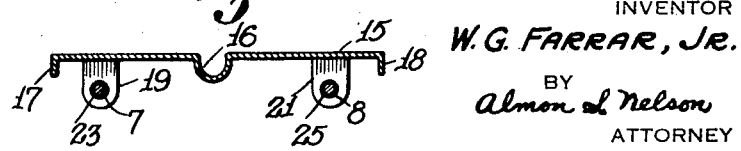
INVENTOR
W. G. FARRAR, JR.
BY
Almon L. Nelson
ATTORNEY Patented June 15, 1948

2,443,381

UNITED STATES PATENT OFFICE 2,443,381

AUTOMOBILE TRAY

Walter G. Farrar, Jr., Richmond, Va.

Application April 19, 1946, Serial No. 663,359

4 Claims. (Cl. 311—21)

The present invention relates to an improvement in an automobile tray or shelf.

More particularly, the invention relates to a retractable tray or shelf structure adapted to be installed within an automobile in a position to be readily available for use by an occupant of the vehicle.

It is one object of the invention to provide a tray or shelf structure that can be quickly and easily mounted in an automobile in conjunction with the usual instrument or dash panel.

Another object of the invention is to provide a tray or shelf structure of the above mentioned character which is simple in construction, can be manufactured at low cost, and can be used in connection with substantially any and all makes and models of automobiles.

A further object of the invention is to provide a tray or shelf structure of the above mentioned character comprising, a bar adapted to be mounted on the instrument panel of the automobile, cantilever supports secured adjacent one end thereof to the bar, the free ends of the supports being bent slightly, a tray or shelf member slidably mounted on the supports, and a closure member removably secured to the front end of the tray or shelf member; and the subcombinations thereof.

Other objects and advantages of the invention will become apparent as the description proceeds, reference being made to the accompanying drawings, wherein:

Fig. 1 is a fragmentary face view of an automobile instrument panel provided with my improved tray or shelf structure, Fig. 2 is a view taken along the line 2—2 of Fig. 3 looking in the direction of the arrows, parts being broken away to show the curvature in the free ends of the cantilever supports, and showing the tray structure in plan view with the tray in retracted position, Fig. 3 is a view taken along the line 3—3 of Fig. 1 looking in the direction of the arrows, showing the tray structure in side elevation with the tray in retracted position, Fig. 4 is a view similar to Fig. 3 showing the tray in an extended position.

Fig. 5 is a transverse sectional view of the tray structure taken along the line 5—5 of Fig. 2 looking in the direction of the arrows, and Fig. 6 is an enlarged detail view illustrating the preferred manner of securing the cantilever supports to the bar, and the bar to the instrument panel of the automobile.

Referring in detail to the drawing, my improved tray or shelf device comprises a bar 1 adapted to be secured to the dash or instrument panel 2 of an automobile.

In the embodiment chosen for illustration, the bar 1 is secured to the flange 3 of the instrument panel 2 by means of a plurality of screws 4 or other suitable means extending through openings 5 provided in the flange 3 and threaded into tapped openings 6 provided in the bar 1.

Cantilever supports comprising a pair of spaced tubular members or rods 7 and 8, preferably having upturned front ends 9 and 10, are secured to the bar 1 adjacent the front ends 9 and 10 thereof preferably by welding as indicated at 11, 12 (Fig. 6). The rods 7 and 8 extend rearwardly from the bar 6, generally parallel to each other, to a point adjacent the rear or free ends 13 and 14 thereof, where, as illustrated in Fig. 2, the rods 7 and 8 are bent inwardly for a purpose to be later described. It will be obvious, as the description proceeds, that the rods 7 and 8 may be bent outwardly, rather than inwardly, or in some other direction, but best results are obtained by bending the rods so that they either converge or diverge at the rear or free ends 13 and 14 thereof.

The shelf or tray member 15 preferably comprises a metal plate provided with a groove 16 extending longitudinally and centrally thereof, and depending flanges 17 and 18 along the sides thereof. The groove and flanges add rigidity to the tray member.

Two pairs of aligned lugs 19, 20 and 21, 22, respectively, are secured to the bottom of the tray member 15 adjacent the rear end thereof in any suitable manner, as by welding. The lugs 19, 20 and 21, 22 are provided with aligned openings 23, 24 and 25, 26, respectively, for mounting the tray member for sliding movement upon the rods 7 and 8.

In retracted position, as illustrated in Figs. 2 and 3, the tray member 15 extends just through an opening 26 suitably provided in the instrument panel 2. In this position, the bent ends 13 and 14 of the rods 7 and 8 cause a binding action between the lugs 19, 20 and 21, 22 and the rods 7 and 8, respectively, thereby securely holding the tray member 15 against vibration.

A closure member 27 for the opening 26 is removably secured to the front end of the tray member 15, preferably by screws 28 or other suitable means extending through openings provided in the closure member and threaded into tapped recesses provided in the front end of the tray 15 including the flanges 17 and 18. Obviously other suitable means may be used to removably secure the cover member to the tray, if desired.

The closure member 27 is provided with a suitable handle member or knob 29 whereby the tray member may be readily moved from its retracted position illustrated in Figs. 2 and 3, to an extended position such as illustrated in Fig. 4, or vice versa.

To install my improved shelf or tray structure on the instrument panel 2, the openings 5 are drilled in the flange 3, and the opening 26 is cut out in any well known manner.

The bar 1 with the rods 7 and 8 secured thereto is then secured to the flange 3 by means of the screws 6.

Next, the shelf or tray member 15 is slidably mounted upon the rods 7 and 8. This is accomplished by manually holding the bent ends 13 and 14 of the rods in a substantially straightened position while passing the rods 7 and 8 through the aligned openings 23, 24 and 25, 26 of the lugs 19, 20 and 21, 22, respectively.

The tray member 15 is then moved through the opening 26 to an extended position and the closure member 27 is secured thereto by means of the screws 28.

From the foregoing description it will be obvious that I have provided a novel tray or shelf structure for use in automobiles which is simple in construction, easy to install, cheap to manufacture, and free of vibration.

While the invention is susceptible of various modifications and alternative constructions, I have shown in the drawings and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim:

1. A pull-out tray device for mounting on an instrument panel of an automobile, comprising in combination, a bar adapted to be secured to said instrument panel, cantilever supports comprising a pair of spaced rods secured to said bar and extending generally parallel to each other, a tray member having two pairs of aligned lugs secured thereto adjacent the rear end thereof having means for mounting said tray member for sliding movement upon said rods, the free ends of said rods being bent to cause a binding action between said lugs and said rods when said tray member is in retracted position, thereby holding said tray member against vibration, a closure member at the front end of said tray, and means for removably securing said closure member to said tray member.

2. A pull-out tray device for mounting on an instrument panel of an automobile, comprising in combination, a bar adapted to be secured to said instrument panel, cantilever supports comprising a pair of spaced rods secured to said bar adjacent the front ends thereof, a tray member having lugs secured thereto adjacent the rear end thereof having means for mounting said tray member for sliding movement upon said rods, at least one of said rods being bent adjacent the rear end thereof to cause a binding action between said lugs and said rods when said tray member is in retracted position, thereby holding said tray member against vibration, and a closure member removably secured to the front end of said tray member.

3. A pull-out tray device for mounting on an intrument panel of an automobile, comprising in combination, a bar adapted to be secured to said instrument panel, cantilever supports secured adjacent one end thereof to said bar, a tray member mounted for sliding movement on said supports, the free end of at least one of said supports being bent to cause a binding action between said supports and said tray member when said tray member is in retracted position, thereby holding said tray member against vibration, and a closure member removably secured to the front end of said tray member.

4. In a pull-out tray device, the combination comprising, a bar adapted to be secured to a supporting structure, and cantilever supports secured adjacent one end thereof to said bar, a tray member mounted for sliding movement on said supports, the free end of at least one of said supports being bent to cause a binding action between said supports and said tray member when said tray member is in retracted position, thereby holding said tray member against vibration.

WALTER G. FARRAR, Jr.

REFERENCES CITED

The following references are of record in the file of this patent:

UNITED STATES PATENTS

| Number | Name | Date |
| --- | --- | --- |
| 222,612 | Vaughan | Dec. 16, 1879 |
| 475,230 | Zumdick | May 17, 1892 |
| 1,304,133 | Wheary | May 20, 1919 |
| 1,486,364 | Chapman | Mar. 11, 1924 |
| 1,964,831 | Rein | July 3, 1934 |
| 2,177,575 | Maxwell et al. | Oct. 24, 1939 |
| 2,270,557 | Randall | Jan. 20, 1942 |
| 2,292,797 | Roberts | Aug. 11, 1942 |